July 11, 1933.    C. O. BROWNE    1,917,495
DISCHARGE TUBE WITH OPTICAL SLITS
Filed June 11, 1929

Inventor
Cecil Oswald Browne,
By
Cameron, Kirkam & Sutton.
Attorneys

Patented July 11, 1933

1,917,495

UNITED STATES PATENT OFFICE

CECIL OSWALD BROWNE, OF EALING COMMON, LONDON, ENGLAND, ASSIGNOR, BY MESNE ASSIGNMENTS, TO RADIO CORPORATION OF AMERICA, OF NEW YORK, N. Y., A CORPORATION OF DELAWARE

DISCHARGE TUBE WITH OPTICAL SLITS

Application filed June 11, 1929, Serial No. 370,114, and in Great Britain July 14, 1928.

The present invention relates to optical slits.

According to the present invention, a projection is formed upon the envelope of a discharge lamp, an optical slit being formed at the intersection of two relatively inclined surfaces of the projection.

According to a further feature of the present invention, the glow is concentrated in the region of the slit with the aid of an electrode placed externally of the envelope but in the neighbourhood of the slit.

The invention is not however limited to discharge lamps of any particular shape, nor to devices of the glow discharge type, as it may also be embodied in gaseous discharge devices.

The invention is illustrated in two forms in the accompanying drawing.

Figure 1:
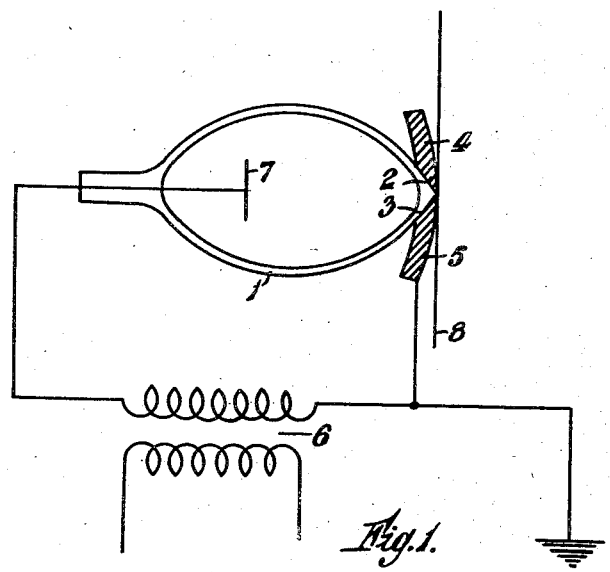

Referring to Fig. 1, the envelope of a glow discharge lamp 1 is made of glass or quartz and upon the outer surface of the envelope is formed a projection having two flat surfaces 2 and 3. In one arrangement, the two surfaces 2 and 3 are carefully ground at right angles to one another and so that they intersect in a sharp line. The sharp edge is then ground off to form a "flat" having a width equal to the width of the optical slit desired. The slit operates for the reason that all light which strikes the inclined faces is totally internally reflected and only the light which strikes the "flat" is allowed to pass to the outside. Within the lamp is arranged an electrode, and a suitable gas filling may be provided in known manner.

In a modified arrangement, the angle between the two surfaces 2, 3 may be such that total internal reflection of the light falling on them does not take place and the slit width is then determined by the width of the gap between the cheek pieces 4 and 5.

High frequency oscillations, modulated with acoustic currents to be recorded (where the arrangement is used in producing a photographic sound record), are fed into the primary winding of the transformer 6 the secondary winding of which is connected on the one hand to the internal electrode 7 and on the other hand to earth and to the cheeks 4, 5 which are of metal and act as the other electrode of the discharge tube. By arranging the electrode 4, 5, externally of the tube in the neighbourhood of the slit, the glow is concentrated in the slit and is thus made most effective. The photographic film 8 is run over the cheeks 4, 5 as shown.

Figure 2:
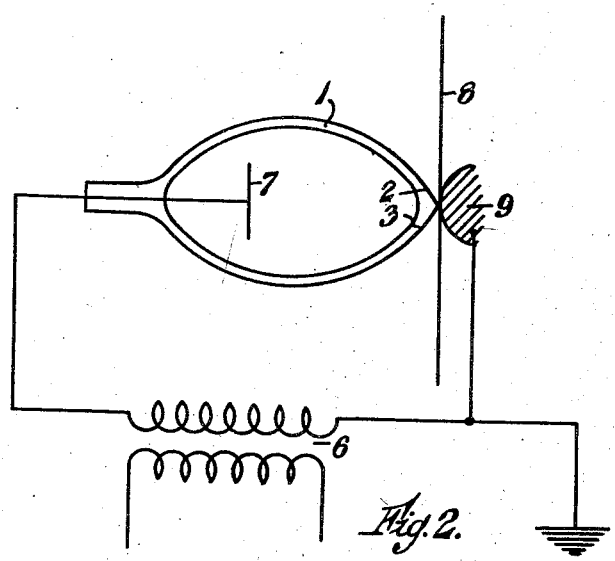

In the arrangement shown in Fig. 2, the discharge tube and its connections are the same as in Fig. 1 excepting that the pressure foot device 9 serves as the outer electrode. Cheeks may, if desired, be provided as in Fig. 1, and in this case, they may be of insulating material.

In an alternative arrangement, the inclined surfaces 2, 3 of the prism slit device may be metal coated and the metal coating may be utilized as the external electrode.

It will be understood by those skilled in the art that the invention is not limited to the particular type of discharge device described above and illustrated in the drawing, but may be applied to devices of various shapes and types, such as gaseous discharge devices as well as glow dicharge devices. Likewise devices embodying the invention may be employed for other purposes than recording sound, such as reproduction of sound, etc.

I claim:

1. A discharge tube comprising a transparent envelope having thereon a projection, an optical slit being formed at the intersection of two relatively inclined surfaces of said projection.

2. A discharge tube comprising a transparent envelope having thereon a projection, an optical slit being formed at the intersection of two surfaces of said projection that are relatively inclined at an angle such that all light striking said inclined surfaces is totally internally reflected.

3. A discharge tube comprising a transparent envelope having thereon a projection, an optical slit being formed at the intersection of two relatively inclined surfaces of said projection and said inclined surfaces being metal coated.

4. A discharge tube comprising an envelope having thereon a projection, an optical slit being formed at the intersection of two relatively inclined surfaces of said projection and one of the electrodes of said tube being disposed externally of said envelope.

5. A discharge tube comprising an envelope having thereon a projection, an optical slit being formed at the intersection of two relatively inclined surfaces of said projection, said tube having an electrode disposed externally of said envelope adjacent said optical slit.

6. A discharge tube comprising an envelope having thereon a projection, an optical slit being formed at the intersection of two relatively inclined surfaces of said projection, said tube having an electrode disposed externally of said envelope and constituting a metal covering for said inclined surfaces.

7. In apparatus for recording electric oscillations on a sensitive film of the type embodying a moving sensitive film and a discharge tube comprising an envelope and a plurality of electrodes, a discharge tube having one of said electrodes external to its envelope and constituting a guide for a film passing between it and said envelope.

8. In apparatus for recording electrical oscillations on a sensitive film of the type embodying a moving sensitive film and a discharge tube comprising an envelope and a plurality of electrodes, a discharge tube having one of said electrodes external to its envelope and constituting film guiding means.

9. A discharge tube comprising a transparent envelope having thereon a projection, an optical slit being formed at the intersection of two relatively inclined surfaces of said projection, metallic members applied externally to said surfaces and constituting an external electrode for said tube, said members providing an aperture aligned with said optical slit.

10. A discharge tube comprising a transparent envelope having thereon a projection, an optical slit being formed at the intersection of two relatively inclined surfaces of said projection, metallic members applied to said inclined surfaces and constituting an external electrode for said tube, said members being shaped to constitute film guiding means.

11. A discharge device comprising an envelope formed with two relatively inclined surfaces and having an optical slit formed at the intersection of said surfaces, the inclination of said surfaces being such that all light striking them is totally internally reflected.

12. A discharge device comprising an envelope formed wih two relatively inclined surfaces and having an optical slit formed at their intersection, and a metal coating for said inclined surfaces.

In testimony whereof I have signed my name to this specification.

CECIL OSWALD BROWNE.